US012711415B2

(12) United States Patent
El-Khamy et al.

(10) Patent No.: US 12,711,415 B2
(45) Date of Patent: Aug. 18, 2026

(54) SYSTEM AND METHOD FOR FEDERATED LEARNING USING WEIGHT ANONYMIZED FACTORIZATION

(71) Applicant: Samsung Electronics Co., Ltd., Suwon-si (KR)

(72) Inventors: Mostafa El-Khamy, San Diego, CA (US); Jungwon Lee, San Diego, CA (US); Weituo Hao, Durham, NC (US); Lawrence Carin, Chapel Hill, NC (US); Nikhil Mehta, Durham, NC (US); Kevin J. Liang, Durham, NC (US)

(73) Assignee: SAMSUNG ELECTRONICS CO., LTD. (KR)

( * ) Notice: Subject to any disclaimer, the term of this patent is extended or adjusted under 35 U.S.C. 154(b) by 990 days.

(21) Appl. No.: 17/148,557

(22) Filed: Jan. 13, 2021

(65) Prior Publication Data

US 2021/0374608 A1 Dec. 2, 2021

Related U.S. Application Data

(60) Provisional application No. 63/033,747, filed on Jun. 2, 2020.

(51) Int. Cl.
*G06N 20/00* (2019.01)
*G06F 16/23* (2019.01)

(52) U.S. Cl.
CPC ......... *G06N 20/00* (2019.01); *G06F 16/2379* (2019.01)

(58) Field of Classification Search
CPC ............................ G06N 20/00; G06F 16/2379
See application file for complete search history.

(56) References Cited

U.S. PATENT DOCUMENTS 6,591,146 B1 * 7/2003 Pavlovic ................ G06N 20/00 700/47
10,657,461 B2 5/2020 McMahan et al.
(Continued)

FOREIGN PATENT DOCUMENTS

CN 110377726 A * 10/2019 ............ G06F 16/35

OTHER PUBLICATIONS

Yurochkin, Mikhail, et al. "Bayesian nonparametric federated learning of neural networks." International conference on machine learning. PMLR, 2019. (Year: 2019).*
(Continued)

*Primary Examiner* — Li B. Zhen
*Assistant Examiner* — Griffin Tanner Bean
(74) *Attorney, Agent, or Firm* — Renaissance IP Law Group LLP

(57) ABSTRACT

A federated machine-learning system includes a global server and client devices. The server receives updates of weight factor dictionaries and factor strengths vectors from the clients, and generates a globally updated weight factor dictionary and a globally updated factor strengths vector. A client device selects a group of parameters from a global group of parameters, and trains a model using a dataset of the client device and the group of selected parameters. The client device sends to the server a client-updated weight factor dictionary and a client-updated factor strengths vector. The client device receives the globally updated weight factor dictionary and the globally updated factor strengths vector, and retrains the model using the dataset of the client device, the group of parameters selected by the client device, and the globally updated weight factor dictionary and the globally updated factor strengths vector.

20 Claims, 4 Drawing Sheets

(56) References Cited

U.S. PATENT DOCUMENTS

| | | | | |
|---|---|---|---|---|
| 2019/0385043 | A1* | 12/2019 | Choudhary | G06F 13/4213 |
| 2020/0202243 | A1 | 6/2020 | Guttmann | |
| 2020/0242514 | A1 | 7/2020 | McMahan et al. | |
| 2020/0285980 | A1 | 9/2020 | Sharad et al. | |

OTHER PUBLICATIONS

Taylor, Graham W., and Geoffrey E. Hinton. "Factored conditional restricted Boltzmann machines for modeling motion style." Proceedings of the 26th annual international conference on machine learning. 2009. (Year: 2009).*

Amiri, Mohammad Mohammadi et al., "Federated Learning With Quantized Global Model Updates", Princeton University, Imperial College London, Jun. 18, 2020, 15 pages.

Hanzely, Filip et al., "Federated Learning of a Mixture of Global and Local Models", King Abdullah University of Science and Technology, Thuwal, Saudi Arabia, Feb. 14, 2020, 43 pages.

Mehta, Nikhil et al., "Bayesian Nonparametric Weight Factorization for Continual Learning," arXiv preprint arXiv:2004.10098v1, Apr. 2020, 17 pages.

* cited by examiner

SYSTEM AND METHOD FOR FEDERATED LEARNING USING WEIGHT ANONYMIZED FACTORIZATION

CROSS-REFERENCE TO RELATED APPLICATION

This application claims the priority benefit under 35 U.S.C. § 119(e) of U.S. Provisional Application No. 63/033,747, filed on Jun. 2, 2020, the disclosure of which is incorporated herein by reference in its entirety.

TECHNICAL FIELD

The subject matter disclosed herein relates to federated machine learning. More particularly, the subject matter disclosed herein relates to a system and a method for federated machine learning.

BACKGROUND

The growth of the Internet of Things (IoT), the proliferation of smart phones and digitization of records has contributed to modern systems that generate increasingly larger quantities of data. The data that is generated may provide extensive information about individuals, which on one hand may lead to highly personalized intelligent applications, but on the other hand may also be sensitive and should be kept private. Examples of such private data include, but are not limited to, images of faces, typing histories, medical records, and survey responses.

SUMMARY

An example embodiment provides a client device in a federated machine-learning system that may include at least one computing device, a communication interface, and a processor. The processor may be coupled to the at least one computing device and to the communication interface. The processor may select a group of parameters for the client device from a global group of parameters, train a model using a dataset of the client device and the group of parameters selected by the client device in which the dataset may be formed from an output of the at least one computing device, update a weight factor dictionary and a factor strengths vector after training the model, send through the communication interface to a global server a client-updated weight factor dictionary and a client-updated factor strengths vector, receive through the communication interface from the global server a globally updated weight factor dictionary and a globally updated factor strengths vector, and retrain the model using the dataset of the client device, the group of parameters selected by the client device, and the globally updated weight factor dictionary and the globally updated factor strengths vector. In one embodiment, the client device may be part of a group of N client devices in which N is an integer. In another embodiment, the processor selects the group of parameters from the global group of parameters by using three variational parameters that may include seed values, and minimizes a difference between a supervised learning of the dataset and a regularization of the selected group of parameters and the global group of parameters. The processor may select the group of parameters from the global group of parameters by receiving the global group of parameters that has been sent from the global server to a first subset of client devices of the N client devices, the client device being part of the first subset of client devices. The client device may receive the globally updated weight factor dictionary and a globally updated factor strengths vector by receiving the globally updated weight factor dictionary and a globally updated factor strengths vector that were sent by the global server to a second subset of the N client devices in which the client device may be part of the second subset of client devices. In still another embodiment, the processor may send a request through the communication interface to the global server for a current version of the global group of parameters, may update the model using the current version of the global group of parameters, and may evaluate the model updated using the current version of the global group of parameters to form an inference based on the dataset of the client device.

An example embodiment provides a federated machine-learning system that may include a global server and N client devices. The global server may receive updates of weight factor dictionaries and factor strengths vectors from N client devices, in which N is an integer, and may generate a globally updated weight factor dictionary and a globally updated factor strengths vector. At least one client device may include at least one computing device, a communication interface, and a processor. The processor may be coupled to the at least one computing device and to the communication interface. The processor may select a group of parameters from a global group of parameters, train a model using a dataset of the client device and the group of parameters selected by the client device, update a weight factor dictionary and a factor strengths vector after training the model, send through the communication interface a client-updated weight factor dictionary and a client-updated factor strengths vector, receive through the communication interface from the global server the globally updated weight factor dictionary and the globally updated factor strengths vector, and retrain the model using the dataset of the client device, the group of parameters selected by the client device, and the globally updated weight factor dictionary and the globally updated factor strengths vector. In one embodiment, the processor may select the group of parameters from the global group of parameters by using three variational parameters that may include seed values, and minimizes a difference between a supervised learning of the dataset and a regularization of the selected group of parameters and the global group of parameters. In another embodiment, the processor may select the group of parameters from the global group of parameters by receiving the global group of parameters that has been sent from the global server to a first subset of client devices of the N client devices in which the client device may be part of the first subset of client devices. In another embodiment, the client device may receive the globally updated weight factor dictionary and a globally updated factor strengths vector by receiving the globally updated weight factor dictionary and a globally updated factor strengths vector that were sent by the global server to a second subset of the N client devices in which the client device may be part of the second subset of client devices. In one embodiment, the processor may send a request through the communication interface to the global server for a current version of the global group of parameters, may update the model using the current version of the global group of parameters, and may evaluate the model updated using the current version of the global group of parameters to form an inference based on the dataset of the client device.

An example embodiment provides a method for federated machine-learning that may include: selecting, at a client device, a group of parameters from a global group of parameters, the global group of parameters including a weight factor dictionary and a factor strengths vector; training, at the client device, a model using a dataset of the client device and the group of parameters selected by the client device; updating a weight factor dictionary and a factor strengths vector after training the model; sending, from the client device to a global server, a client-updated weight factor dictionary and a client-updated factor strengths vector; receiving, from the global server at the client device, a globally updated weight factor dictionary and a globally updated factor strengths vector; and retraining, at the client device, the model using the dataset of the client device, the group of parameters selected by the client device, and the globally updated weight factor dictionary and the globally updated factor strengths vector. In one embodiment, the client device may be part of a group of N client devices in which N is an integer. In another embodiment, selecting the group of parameters from the global group of parameters may include selecting the group of parameters using three variational parameters that comprise seed values; and minimizing a difference between a supervised learning of the dataset and a regularization of the selected group of parameters and the global group of parameters. In still another embodiment, selecting the group of parameters from the global group of parameters may include receiving, at the client device, the global group of parameters that has been sent from the global server to a first subset of client devices of the N client devices in which the client device may be part of the first subset of client devices. In yet another embodiment, receiving, from the global server at the client device, the globally updated weight factor dictionary and a globally updated factor strengths vector may include receiving, at the client device, the globally updated weight factor dictionary and a globally updated factor strengths vector that were sent by the global server to a second subset of the N client devices in which the client device may be part of the second subset of client devices. In one embodiment, the method may further include requesting by the client device from the global server a current version of the global group of parameters; receiving the current version of the global group of parameters; updating the model using the current version of the global group of parameters; and evaluating the model updated using the current version of the global group of parameters to form an inference based on the dataset of the client device.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
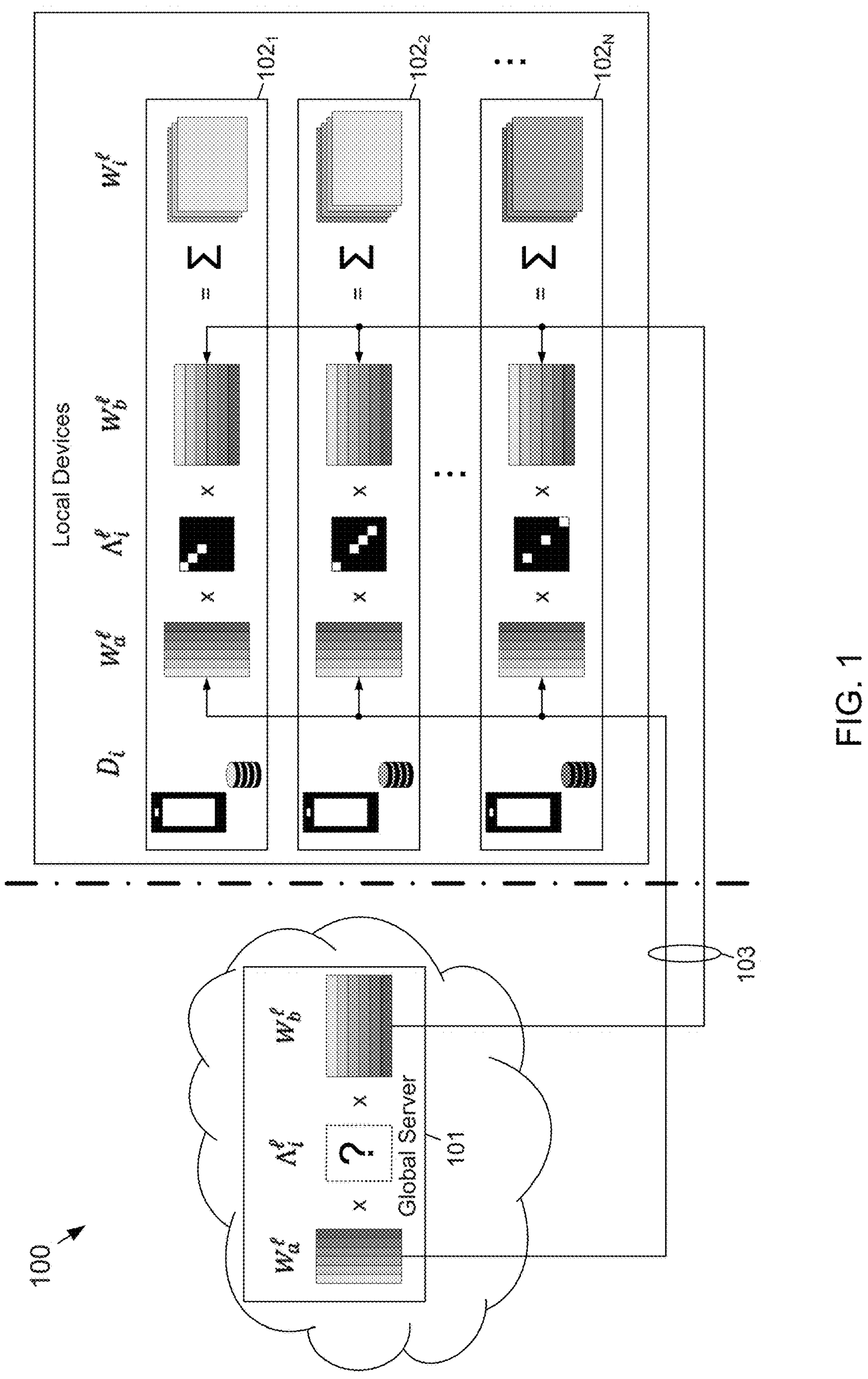
FIG. 1 depicts a functional block diagram of an example embodiment of a federated-learning system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

Federated learning has been proposed as providing machine learning that may possibly keep personalized data private by keeping user data locally on each client device and only sharing model updates with a global server. Thus, federated learning represents a possible strategy for training machine-learning models on heterogeneous, distributed networks in a privacy-preserving manner.

While a federated machine-learning paradigm may provide a way for keeping private data private, there still remains a number of challenges for federated machine-learning systems. For example, a currently used federated machine-learning system includes a single global model that is used by each client. The single-model approach, however, may not work well for particular subpopulations because there may be a skewed data distribution across different clients.

To illustrate this, consider N client devices, and that the $i^{th}$ client device includes a data distribution $\mathcal{D}_i$ that differs from other client devices as a function of i. In a traditional federated machine-learning setting, a single global model that may be learned may be deployed on all N client devices. The traditional approach assumes a multilayer perceptron (MLP) architecture having layers l=1, . . . , L, and a set of weights $\theta=\{W^l\}_{l=1:L}$ that are shared across all client devices. To satisfy a global objective, a set of weights θ may be learned to minimize a loss on average across all clients. For example, one traditional federated machine-learning system minimizes the following objective:

$$\min_{\theta} f(\theta) = \sum_{i=1}^{N} p_i F_i(\theta) = \mathbb{E}_i[F_i(\theta)] \quad (1)$$

in which i is an index of client devices, N is the number of clients, $F_i(\theta)$ is a local objective function, and $p_i \geq 0$ is the weight of each device i.

Given statistical heterogeneity, a one-size-fits-all-type of approach may, however, lead to the global model performing poorly on certain clients. Often the performance may translate to how close the local distribution of a particular client matches the distribution of the entire population. As a result, the model for this example traditional federated machine-learning system may be viewed as less fair to clients having data traits that are less common among the clients.

The subject matter disclosed herein may improve model consistency for federated learning by using a Bayesian nonparametric weight factorization that may provide a personalized federated-learning solution that may achieve a higher local-model performance across numerous clients.

The federated machine-learning system disclosed herein includes at least three improved features as compared to traditional federated-learning systems. A first improved feature is that the network over which federated learning occurs is split into two parts. The first part provides server aggregation and the second part is used for client personalization. A second improved feature relates to a reduced amount of data that is communicated between a global server and client devices. That is, data communication between the global server and the client devices is more efficient because kernel factorization is used in the client devices and only a subset of the parameters used for training is communicated. A third improved feature relates to an extra layer of security provided by the kernel factorization and that only a subset of the parameters used for training is communicated.

The federated machine-learning system disclosed herein provides a federated-learning system that efficiently uses data in a global model to train neural networks in N local models in a factorized way. Each client model may be personalized based on a local distribution at the client, and with all client models sharing jointly learned components.

FIG. 1 depicts a functional block diagram of an example embodiment of a federated-learning system 100 according to the subject matter disclosed herein. The federated-learning system 100 may include a global server 101 and N clients (i.e., local devices) 102$_1$-102$_N$. The global server 101 may be located in the cloud at a single location or at distributed locations. The term "global server" as used herein means any server device configured to communicate (wired and/or wirelessly) with two or more client devices via a wide-area network (e.g., the internet), and may be any server device configured to directly communicate with two or more client devices in a federated machine-learning system. The clients $102_1$-$102_N$ are communicatively coupled to the global server 101 over a communication link 103. The communication link 103 may be a wired communication link and/or a wireless communication link.

Figure 2B:
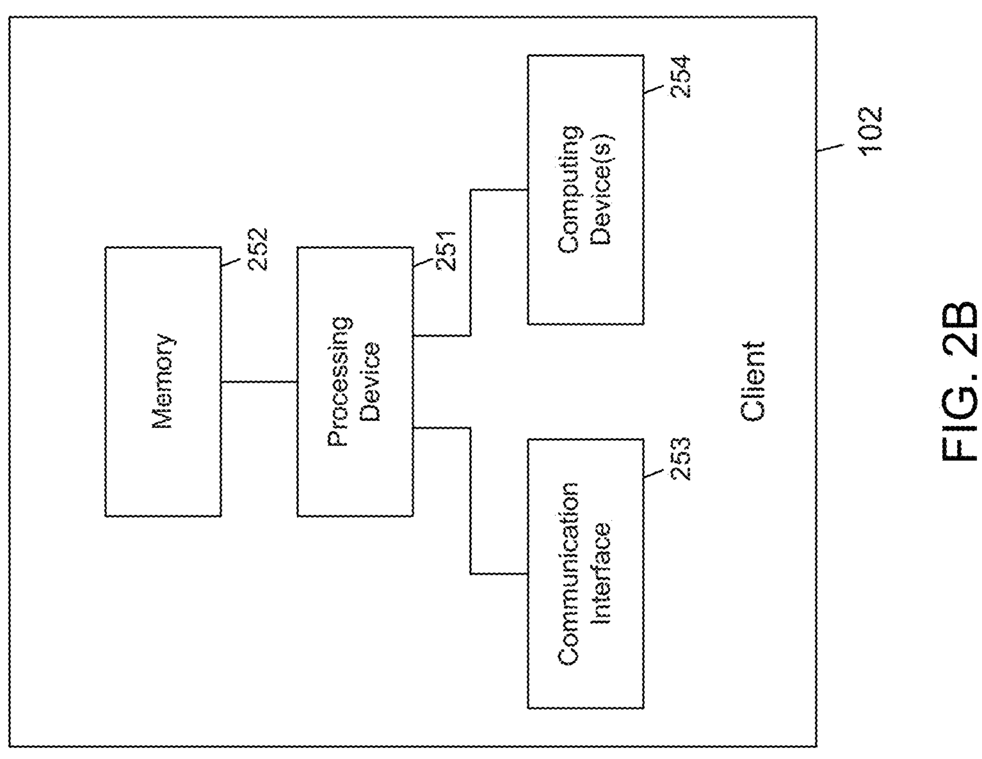
FIGS. 2A and 2B respective depict functional block diagrams of example embodiments of a global server and a client according to the subject matter disclosed herein.
Figure 2A:
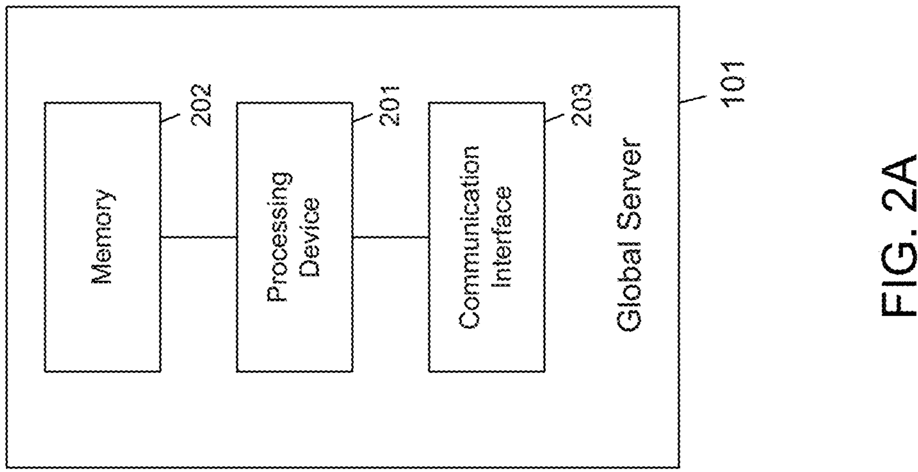

FIGS. 2A and 2B respective depict functional block diagrams of example embodiments of a global server 101 and a client 102 according to the subject matter disclosed herein. A global server 101 may include a processing device 201, such as a central processing unit (CPU), that is communicatively coupled to a memory 202, and a communication interface 203. The memory 202 may include non-volatile and/or volatile memory. The communication interface 203 may be configured to communicate to a network fabric, such as, but not limited to the internet. The communication interface 203 may be a wired and/or a wireless communication interface. Other configurations for the global server 101 are possible. The global server 101 may be configured to provide federated machine-learning functionality as described herein. In one embodiment, the federated machine-learning functionality provided by the global server 101 may be provided by one or more modules that may be any combination of software, firmware and/or hardware configured to provide the functionality described herein.

A client 102 may include a processing device 251, such as a CPU, that is communicatively coupled to a memory 252, a communication interface 253, and one or more computing devices 254. The one or more computing devices 254 may include a capability to sense or collect information relating to, but not limited to, motion, one or more images, a biometric and/or medical condition of a human and/or a non-human animal and/or a plant, a sound, a voice, a location, metadata, application use (i.e., browsing history), and/or survey responses. In one embodiment, at least one computing device 254 is a sensing device. Other configurations for a client device 102 are possible. A client 102 may be configured to provide federated machine-learning functionality as described herein. In one embodiment, the federated machine-learning functionality provided by a client 102 may be provided by one or more modules that may be any combination of software, firmware and/or hardware configured to provide the functionality described herein.

A client $102_i$ may have a local model having a weight matrix $$\theta_i = \{W_i^\ell\}_{\ell=1}^L$$

for L layers that may be trained on a data distribution $\mathcal{D}_i$. Each set of weights $\theta_i$ may be maximally specific to the data distribution $\mathcal{D}_i$ of each client i. Each client, however, typically has limited data, which may be insufficient for training a full model without overfitting. So the total number of parameters that must be learned across all clients scales with the number of clients. Learning N separate models, however, may not take advantage of similarities between client data distributions or the shared learning task. To make more efficient use of data, the federated machine-learning system 100 provides a balance between a single global model and N local models. That is, each client model may be personalized to the local data distribution with all models sharing jointly learned components. To do this, weight matrix $$\theta_i = \{W_i^\ell\}_{\ell=1}^L$$

for a client i is factorized as:

$$W_i^\ell = W_a^\ell \Lambda_i^\ell W_b^\ell, \ \ell = 1, \ldots, L \tag{2}$$

$$\Lambda_i^\ell = \mathrm{diag}(\lambda_i^\ell) \tag{3}$$

in which $$W_a^\ell \text{ and } W_b^\ell$$

are dictionaries of rank-1 of weight factors that may be shared across clients, and $$\Lambda_i^\ell$$

is the diagonal personalized matrix for each client i.

The factorization may be equivalently expressed as:

$$W_i^\ell = \sum_{k=1}^F \lambda_{i,k}^\ell \left(w_{a,k}^\ell \otimes w_{b,k}^\ell\right) \tag{4}$$

in which $$w_{a,k}^\ell$$

is the k$^{th}$ column of $$W_a^\ell, \ w_{b,k}^\ell$$

is the kth row of $$W_b^\ell,$$

and ⊗ represents an outer product. Written this way, the interpretation of the corresponding pairs of columns and rows $$w_{a,k}^\ell \text{ and } w_{b,k}^\ell$$

as weight factors becomes more apparent. The dictionaries $$W_a^\ell \text{ and } W_b^\ell$$

together form a global dictionary of the weight factors, and $$\lambda_i^\ell$$

can be viewed as factor scores of client i. Differences in $$\lambda_i^\ell$$

between clients allows for customization of the model to the data distribution of each client, while sharing the underlying factors $$W_a^\ell \text{ and } W_b^\ell$$

enables learning from the data of all clients.

Each client factors score $$\lambda_i^\ell$$

may be formed as an element-wise product:

$$\lambda_i^\ell = r_i^\ell \odot b_i^\ell \quad (5)$$

in which $$r_i^\ell \in \mathbb{R}^F$$

indicates a strength for each factor, and $$b_i^\ell \in \{0, 1\}^F$$

is a binary vector that indicates active factors. As described below, $$b_i^\ell$$

is typically sparse, so generally each client only uses a small subset of the available weight factors. As used herein, the absence of the $\ell$ superscript (e.g., $\lambda_i$) refers to the entire collection across all layers L for which factorization is performed. Point-estimates may be learned for $W_a$, $W_b$ and factor strengths $r_i$.

Within the context of federated machine-learning with statistical heterogeneity, there are a number of desirable properties that the client factor scores should collectively have. As previously mentioned, $$b_i^\ell$$

is typically sparse and as a result $\lambda_i$ is also sparse, which encourages consolidation of related knowledge while minimizing interference. That is, a client A should be able to update global factors during training without destroying the ability of a client B to perform the task of client B. On the other hand, factors should be reused among clients. While data may be non-independent and non-identically distributed across clients, often there is some similarities or overlap of the data. The shared factors distribute learning across all client data, which avoids an N independent-model scenario. Additionally, in a distributed setting considered for federated machine learning, the total number of nodes is rarely pre-defined. Therefore, a system should be able to be gracefully expanded to accommodate new clients without re-initializing the entire model. This feature includes both increasing server-side capacity (if necessary) and initializing new clients.

To encourage sparsity on a diagonal personalized matrix $$\Lambda_i^\ell,$$

the diagonal vector may be regularized using a process that is similar to the Indian Buffet Process (IBP). The posterior distribution of the diagonal vector may be forced to be as close as possible to a prior diagonal vector by variational inference. Using a Bayesian nonparametric approach may allow the data to dictate a client factor assignment, a factor reuse, and a server-side model expansion. A stick-breaking construction may be used with the IBP as a prior distribution for factor selection as follows:

$$v_{i,k}^\ell \sim \text{Beta}(\alpha, 1) \quad (6)$$

$$\pi_{i,k}^\ell = \prod_{k=1}^{k} v_{i,k}^\ell \quad (7)$$

$$b_{i,k}^\ell \sim \text{Bernoulli}(\pi_{i,k}^\ell) \quad (8)$$

in which $\alpha$ may be a hyperparameter controlling an expected number of active factors and the rate of new factors that are incorporated, and k indexes the factor.

The posterior distribution may be learned for the random variables $b_i$ and $v_i$. Exact inference of the posterior may be intractable, so a variational inference may be used having a mean-field approximation to determine the active factors for each client device using the following variational distributions that learn the variational parameters (i.e., seed values) $\{\pi_i, c_i, d_i\}$ for each queried client using a Bayes by Backprop propagation:

$$q(\theta_i^\ell) = q(b_i^\ell)q(v_i^\ell) \quad (9)$$

$$b_i^\ell \sim \text{Bernoulli}(\pi_i^\ell) \quad (10)$$

$$v_i^\ell \sim \text{Kumaraswamy}(c_i^\ell, d_i^\ell) \quad (11)$$

To have a differentiable parameterization, a Kumaraswamy distribution may be used as a replacement for the Beta distribution of $v_i$ along with a soft relaxation of the Bernouilli distribution. The objective for each client is to maximize the variational lower bound:

$$\mathcal{L}_i = \sum_{n=1}^{|i|} \mathbb{E}_q \log\, p\left(y_i^{(n)} \middle| \theta_i, x_i^{(n)}\right) - KL(q(\theta_i) \| p(\theta_i)) \quad (12)$$

in which $|\mathcal{D}_i|$ is the number of training examples at client i. The first term provides label supervision and the second term regularizes the posterior distribution to not stray far from the IBP prior distribution.

A mean-field approximation may be used to allow expansion of the second term to be:

$$\mathcal{R} = \sum_{\ell=1}^{L} KL(q(b_i^\ell)\|p(b_i^\ell|v_i^\ell)) + KL(q(v_i^\ell)\|p(v_i^\ell)) \quad (13)$$

Before training begins, global weight factors $\{W_a, W_b\}$ and factor strengths r may be initialized by the server 101. Once initialized, each training round begins with $\{W_a, W_b, r\}$ being sent to a selected subset of the total number of clients 102. Each selected (sampled) client then trains the model using their own private data distribution $\mathcal{D}_i$ for E epochs, updating not only the weight factor dictionary $\{W_a, W_b\}$ and the factor strengths r, but also variational parameters $\{\pi_i, c_i, d_i\}$ of the client, which controls which factors the client uses. The data distribution $\mathcal{D}_i$ may include information relating to biometric data, medical data, image data, location data, application use data, thermal data, atmospheric data and/or audio data.

Once local training has completed, each client sends $\{W_a, W_b, r\}$ back to the server, but not the variational parameters $\{\pi_i, c_i, d_i\}$ which remain with the client with data distribution $\mathcal{D}_i$. After the server 101 has received updates from all sampled clients, the various new values for $\{W_a, W_b, r\}$ may be aggregated by the server 101 using an averaging step, which in one embodiment may be a simple averaging step. The process then repeats with the server selecting a new subset of clients to sample, sending the new updated set of global parameters to the new subset, and so on, until a desired number of communication rounds have occurred. This process is summarized by the pseudo-code of Algorithm 1.

may be an option if a network connection is unavailable or too expensive. Normally clients are able to request the most up-to-date parameters.

Data security is one of the central aspects of federated machine learning. Simpler, more standard methods of training a model may be utilized if all data were first aggregated at a central server. The very real possibility of sensitive client data being intercepted during transmission or the data repository of the server 101 being breached by an attacker are both major concerns and motivate that the data be kept on the local device 102 for federated machine learning. On the other hand, only keeping the data at the client-side may not be sufficient for security purposes. Just as data may be compromised in transit or at a central database in non-federated settings, federated training updates are similarly vulnerable. For example, in one example federated machine-learning method, the update includes the entire parameters of the model. This may effectively mean that yielding the data immediately may be a tradeoff for surrendering white-box access to the model, which may open the model to a wide range of malicious activities including exposing the very data that federated machine-learning aims to protect.

For the federated machine-learning system disclosed herein, clients transmit to the server 101 the entire dictionary of weight factors $\{W_a, W_b\}$ and factor strengths r, but not $\{\pi_i, c_i, d_i\}$. Thus, the information relating to which particular factors that a client uses is kept local. That is, neither the client data $\mathcal{D}_i$ nor factor selections $$\Lambda_i^\ell$$

leave the local device. Therefore, even if a message is intercepted, an adversary may not be able completely reconstruct the model, thereby hampering the ability of an adversary to perform an attack to recover the data.

Algorithm 1

```
1:  Input: Communication rounds T, local training epochs E, learning rate η
2:  Server initializes global weight factor dictionaries W_a and W_b, factor strengths r
3:  Clients each initialize variational parameters π_i, c_i, d_i
4:  for t = 1, ..., T do
5:      Server randomly selects subset S_t of clients and sends {W_a, r, W_b}
6:      for client i ∈ S_t in parallel do
7:          W_a, r_i, W_b, π_i, c_i, d_i ←CLIENTUPDATE(W_a, r_i, W_b, π_i, c_i, d_i)
8:          Send {W_a, r, W_b} to the server.
9:      end for
10:     Server aggregates and averages updates {W_a, r_i, W_b}
11: end for
12: function CLIENTUPDATE(W_a, r_i, W_b, π_i, c_i, d_i)
13:     for e = 1; ..., E do
14:         for minibatch b ∈ D_i do
15:             Update {W_a, r_i, W_b, π_i, c_i, d_i} by minimizing Eq. (12)
16:         end for
17:     end for
18:     Return {W_a, r_i, W_b, π_i, c_i, d_i}
19: end function
```

Figure 3:
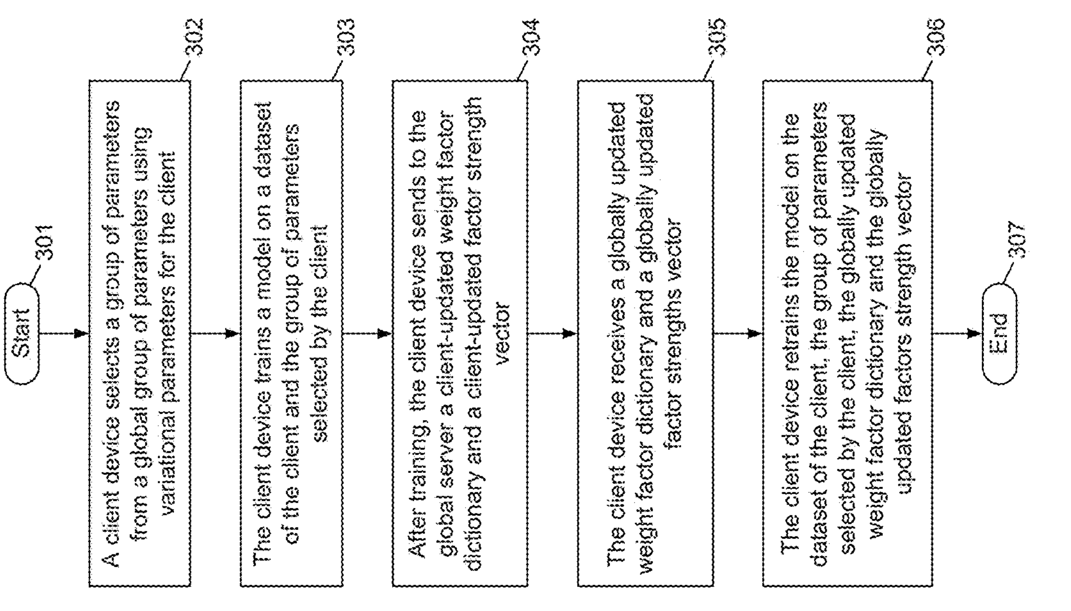
FIG. 3 is a flow diagram for an example embodiment of a method for federated machine-learning at a client device according to the subject matter disclosed herein.

When a client 102 enters an evaluation mode, the client may request a current version of global parameters $\{W_a, W_b, r\}$ from the server. If the client has been previously queried for federated training, the local model includes the aggregated global parameters and the binary vector generated by the local variational parameters $\{\pi_i, c_i, d_i\}$ of the client. Otherwise, the client uses only the aggregated $\{W_a, W_b, r\}$. Note that if a client has been previously sampled, the most recently cached copy of the global parameters at the client FIG. 3 is a flow diagram for an example embodiment of a method 300 for federated machine-learning at a client device according to the subject matter disclosed herein. The method starts at 301. Global parameters, i.e., global weight factor dictionaries and factor strengths, may be initialized by the global server 101 and sent to a selected subset of the total number of clients 102 before training begins. At 302, a group of parameters for a client device is selected by the client device from the global group of parameters. In one embodiment, the client uses variational parameters to form the selection of parameters for the client. At 303, the client device trains a model using a dataset of the client device and the group of parameters selected by the client device. At 304, after training, the client device sends to the global server 101 a client-updated weight factor dictionary and a client-updated factor strength vector, but not the variational parameters that were used by the client to form the selection of parameters for the client or the dataset of the client device. The global server 101 may aggregate client-updated dictionary components and factor strength vectors using an averaging step. The global server 101 may select a new subset of clients to sample, and sends the new updated set of global parameters to the new subset of clients. For the example embodiment of method 300, the client is selected as part of the new subset of clients. At 305, the client device receives from the global server 101 a globally updated weight factor dictionary and a globally updated factor strengths vector. At 306, the client device retrains on the dataset of the client, the group of parameters selected by the client device, the globally updated weight factor dictionary and the globally updated factor strengths vector. The method may continue until a desired number of training epoch have occurred. The method ends at 307.

Figure 4:
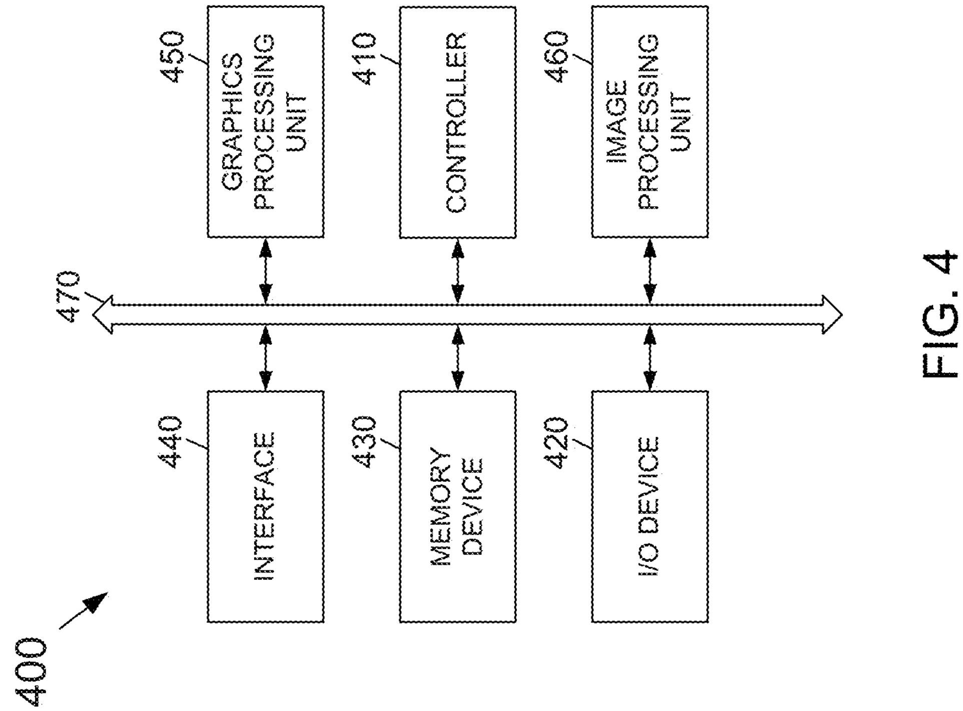
FIG. 4 depicts an electronic device that includes functionality for federated machine learning according to the subject matter disclosed herein.

FIG. 4 depicts an electronic device 400 that includes functionality for federated machine learning according to the subject matter disclosed herein. In one embodiment, the electronic device 400 may be a global server operative to provide federated machine-learning as disclosed herein. In another embodiment, the electronic device 400 may be a client device operative to provide federated machine-learning as disclosed herein. The electronic device 400, whether a global server or a client device, may also be embodied as, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may include a controller 410, an input/output device 420 such as, but not limited to, a keypad, a keyboard, a display, a touch-screen display, a camera, and/or an image sensor, a memory 430, an interface 440, a GPU 450, and an imaging-processing unit 460 that are coupled to each other through a bus 470. The controller 410 may include, for example, at least one microprocessor, at least one digital signal processor, at least one microcontroller, or the like. The memory 430 may be configured to store a command code to be used by the controller 410 or a user data.

The interface 440 may be configured to include a wireless interface that is configured to transmit data to or receive data from a wireless communication network using a RF signal. The wireless interface 440 may include, for example, an antenna. The electronic device 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A client device in a federated machine-learning system, the client device comprising:

at least one computing device;

a communication interface; and a processor coupled to the at least one computing device and to the communication interface, the processor configured to protect data on the client device through the federated machine-learning system by:

selecting a group of parameters for the client device from a global group of parameters, training a client model using a dataset of the client device and the group of parameters selected by the client device, updating a weight factor dictionary based in part on factors of a personalized matrix of the client device and comprising Bayesian nonparametric weight factorization values, and a factor strengths vector accounting for active weight factors, after training the client model, wherein the weight factor dictionary comprises factors of the weights used in the client model such that a weight is generated from a plurality of factors multiplied, sending through the communication interface to a global server a client-updated weight factor dictionary and a client-updated factor strengths vector, receiving through the communication interface from the global server a globally updated weight factor dictionary and a globally updated factor strengths vector, and retraining the model using the dataset of the client device, the group of parameters selected by the client device, and the globally updated weight factor dictionary and the globally updated factor strengths vector so that the client model is personalized relative to those on another client device in the federated machine-learning system;

wherein the client device retains the selected group of parameters locally and transmits only derived update information in the form of the client-updated weight factor dictionary and the client-updated factor strengths vector; and wherein neither the dataset of the client device nor any value of the selected group of parameters leave the client device, such that the global server receives no selected parameter values and is trained only from the locally computed update information to provide enhanced data security.

2. The client device of claim 1, wherein the client device is part of a group of N client devices in which N is an integer equal to 1 or more.

3. The client device of claim 2, wherein the processor selects the group of parameters from the global group of parameters by using three variational parameters that comprise seed values, and minimizes a difference between a supervised learning of the dataset and a regularization of the selected group of parameters and the global group of parameters.

4. The client device of claim 3, wherein the processor selects the group of parameters from the global group of parameters by receiving the global group of parameters that has been sent from the global server to a first subset of client devices of the N client devices, the client device being part of the first subset of client devices.

5. The client device of claim 4, wherein the client device receives the globally updated weight factor dictionary and a globally updated factor strengths vector by receiving the globally updated weight factor dictionary and a globally updated factor strengths vector that were sent by the global server to a second subset of the N client devices, the client device being part of the second subset of client devices.

6. The client device of claim 4, wherein the processor sends a request through the communication interface to the global server for a current version of the global group of parameters, wherein the processor updates the model using the current version of the global group of parameters, and wherein the processor evaluating the model updated using the current version of the global group of parameters to form an inference based on the dataset of the client device.

7. The client device of claim 1, wherein the dataset comprises information relating to at least one of biometric data, medical data, image data, voice data, location data, application-use data, thermal data, atmospheric data, audio data and survey data.

8. A federated machine-learning system, comprising:

a global server that receives updates of weight factor dictionaries and factor strengths vectors from N client devices, in which N is an integer equal to 1 or more, and generates a globally updated weight factor dictionary and a globally updated factor strengths vector; and the client devices, at least one client device comprising:

at least one computing device, a communication interface, and a processor coupled to the at least one computing device and to the communication interface, the processor configured to protect data on the client device through the federated machine-learning system by:

selecting a group of parameters from a global group of parameters, training a client model using a dataset of the client device and the group of parameters selected by the client device, updating a weight factor dictionary based in part on factors of a personalized matrix of the client device and comprising Bayesian nonparametric weight factorization values, and a factor strengths vector accounting for active weight factors, after training the client model, wherein the weight factor dictionary comprises factors of the weights used in the client model such that a weight is generated from a plurality of factors multiplied, sending through the communication interface, a client-updated weight factor dictionary and a client-updated factor strengths vector, receiving through the communication interface from the global server the globally updated weight factor dictionary and the globally updated factor strengths vector, and retraining the model using the dataset of the client device, the group of parameters selected by the client device, and the globally updated weight factor dictionary and the globally updated factor strengths vector so that the model is personalized relative to those on another client device in the federated machine-learning system;

wherein the client device retains the selected group of parameters locally and transmits only derived update information in the form of the client-updated weight factor dictionary and the client-updated factor strengths vector; and wherein neither the dataset of the client device nor any value of the selected group of parameters leave the client device, such that the global server receives no selected parameter values and is trained only from the locally computed update information to provide enhanced data security.

9. The client device of claim 8, wherein the processor selects the group of parameters from the global group of parameters by using three variational parameters that comprise seed values, and minimizes a difference between a supervised learning of the dataset and a regularization of the selected group of parameters and the global group of parameters.

10. The client device of claim 9, wherein the processor selects the group of parameters from the global group of parameters by receiving the global group of parameters that has been sent from the global server to a first subset of client devices of the N client devices, the client device being part of the first subset of client devices.

11. The client device of claim 10, wherein the client device receives the globally updated weight factor dictionary and a globally updated factor strengths vector by receiving the globally updated weight factor dictionary and a globally updated factor strengths vector that were sent by the global server to a second subset of the N client devices, the client device being part of the second subset of client devices.

12. The client device of claim 10, wherein the processor sends a request through the communication interface to the global server for a current version of the global group of parameters, wherein the processor updates the model using the current version of the global group of parameters, and wherein the processor evaluating the model updated using the current version of the global group of parameters to form an inference based on the dataset of the client device.

13. The client device of claim 8, wherein the dataset comprises information relating to at least one of biometric data, medical data, image data, voice data, location data, application-use data, thermal data, atmospheric data, audio data and survey data.

14. A method for protecting data on a client device through a federated machine-learning system, the method comprising:

selecting, at the client device, a group of parameters from a global group of parameters for one or more jointly-learned components, the global group of parameters including a weight factor dictionary and a factor strengths vector;

training, at the client device, a client model using a dataset of the client device and the group of parameters selected by the client device;

updating the weight factor dictionary, based in part on factors of a personalized matrix of the client device and comprising Bayesian nonparametric weight factorization values, and the factor strengths vector accounting for active weight factors, after training the model, wherein the weight factor dictionary comprises factors of the weights used in the machine learning client model such that a weight is generated from a plurality of factors multiplied, sending, from the client device to a global server, a client-updated weight factor dictionary and a client-updated factor strengths vector;

receiving, from the global server at the client device, a globally updated weight factor dictionary and a globally updated factor strengths vector; and retraining, at the client device, the client model using the dataset of the client device, the group of parameters selected by the client device, and the globally updated weight factor dictionary and the globally updated factor strengths vector so that the client model is personalized relative to those on another client device in the federated machine-learning system;

wherein the client device retains the selected group of parameters locally and transmits only derived update information in the form of the client-updated weight factor dictionary and the client-updated factor strengths vector; and wherein neither the dataset of the client device nor any value of the selected group of parameters leave the client device, such that the global server receives no selected parameter values and is trained only from the locally computed update information to provide enhanced data security.

15. The method of claim 14, wherein the client device is part of a group of N client devices in which N is an integer equal to 1 or more.

16. The method of claim 15, wherein selecting the group of parameters from the global group of parameters further comprises selecting the group of parameters using three variational parameters that comprise seed values; and minimizing a difference between a supervised learning of the dataset and a regularization of the selected group of parameters and the global group of parameters.

17. The method of claim 16, wherein selecting the group of parameters from the global group of parameters further comprises receiving, at the client device, the global group of parameters that has been sent from the global server to a first subset of client devices of the N client devices, the client device being part of the first subset of client devices.

18. The method of claim 17, wherein receiving, from the global server at the client device, the globally updated weight factor dictionary and a globally updated factor strengths vector further comprises receiving, at the client device, the globally updated weight factor dictionary and a globally updated factor strengths vector that were sent by the global server to a second subset of the N client devices, the client device being part of the second subset of client devices.

19. The method of claim 17, further comprising:

requesting by the client device from the global server a current version of the global group of parameters;

receiving the current version of the global group of parameters;

updating the model using the current version of the global group of parameters; and evaluating the model updated using the current version of the global group of parameters to form an inference based on the dataset of the client device.

20. The method of claim 14, wherein the dataset comprises information relating to at least one of biometric data, medical data, image data, voice data, location data, application-use data, thermal data, atmospheric data, audio data and survey data.

* * * * *